(12) United States Patent
Mahe

(10) Patent No.: US 6,202,737 B1
(45) Date of Patent: Mar. 20, 2001

(54) HEAT EXCHANGER ASSEMBLY FOR MOTOR VEHICLE

(75) Inventor: Christian Mahe, Le Tremblay sur Mauldre (FR)

(73) Assignee: Valeo Thermique Moteur, La Verriene (FR)

( * ) Notice: Subject to any disclaimer, the term of this patent is extended or adjusted under 35 U.S.C. 154(b) by 0 days.

(21) Appl. No.: 09/463,898

(22) PCT Filed: May 27, 1999

(86) PCT No.: PCT/FR99/01242

§ 371 Date: Jan. 28, 2000

§ 102(e) Date: Jan. 28, 2000

(87) PCT Pub. No.: WO99/61860

PCT Pub. Date: Dec. 2, 1999

(30) Foreign Application Priority Data

May 28, 1998 (FR) ................................. 98 06736

(51) Int. Cl.⁷ .................................................. F28F 9/013
(52) U.S. Cl. ............................. 165/67; 165/140; 180/68.4
(58) Field of Search ..................... 165/67, 140; 180/68.4

(56) References Cited

U.S. PATENT DOCUMENTS

| | | | |
|---|---|---|---|
| 4,531,574 | * 7/1985 | Hoch | ........................ 165/67 |
| 4,997,033 | 3/1991 | Ghiani et al. | ........................ 165/67 |
| 5,139,080 | * 8/1992 | Bolton et al | ........................ 165/67 |
| 5,219,016 | * 6/1993 | Bolton et al. | .................... 165/140 X |
| 5,441,100 | * 8/1995 | Ueda et al. | ........................ 165/67 |
| 5,566,748 | * 10/1996 | Christensen | ........................ 165/67 |
| 5,657,817 | 8/1997 | Heine et al. | ........................ 165/67 |

FOREIGN PATENT DOCUMENTS

| | | |
|---|---|---|
| 297 12 351 U | 9/1997 | (DE) . |
| 42049 | 11/1997 | (WO) ..................................... 165/67 |

* cited by examiner

*Primary Examiner*—Leonard Leo
(74) *Attorney, Agent, or Firm*—Morgan & Finnegan LLP

(57) ABSTRACT

The invention concerns a heat exchanger assembly for a motor vehicle comprising a main exchanger with a body mounted between two manifolds, whereto is assembled at least a secondary exchanger mounted between two manifolds such that a common air stream (F) can pass through the respective exchanger bodies. Each of the main exchanger manifolds is provided, at one end, with a projecting base forming a housing for a pin of the second exchanger, and at another end, with a projecting lug whereon can be locked a clip removably fitted on the secondary exchanger. Another secondary exchanger can be assembled in the same manner on the secondary exchanger.

13 Claims, 4 Drawing Sheets

HEAT EXCHANGER ASSEMBLY FOR MOTOR VEHICLE

BACKGROUND OF THE INVENTION

The invention relates to a heat exchanger assembly for a motor vehicle.

It relates more particularly to a heat exchanger assembly comprising a main exchanger having a body mounted between two manifolds, on which is fitted at least one secondary exchanger having a body mounted between two manifolds, so that a common air stream can pass through the respective bodies of the said exchangers.

The fitting of one or more secondary exchangers onto a main exchanger, such as a cooling radiator of a motor vehicle engine, is already known, so as to form an assembly, also called a module, ready to be installed in the vehicle. This secondary exchanger is most frequently formed of a supercharging air cooler of the engine or of an air-conditioning condenser.

In the module formed in this manner, the secondary exchanger may be disposed, according to the case, either upstream or downstream from the main exchanger, in relation to the direction in which the air stream passing through the respective bodies of the exchangers circulates.

The fitting of the exchanger or exchangers onto the main exchanger is obtained generally by means of lugs integral with the secondary exchanger and screws introduced into the manifolds of the main exchanger. These lugs may be made of plastic material and moulded integrally with the secondary exchanger, or be metallic and soldered onto the secondary exchanger.

Usually, the fixing of these lugs is achieved by tapping screws introduced into studs or bosses which the manifolds of the main exchanger have.

Such an assembly by screws is an expensive operation which is incompatible with the high rates imposed by assembly lines of the automotive industry.

Moreover, the dismounting of the exchangers in the event of intervention on the vehicle is often made difficult.

BRIEF SUMMARY OF THE INVENTION

The object of the invention is in particular to overcome the above-mentioned drawbacks.

For this purpose it proposes an exchanger assembly of the type defined in the introduction, in which each of the manifolds of the main exchanger is equipped, at one end, with a projecting base forming a housing for a pin of the secondary exchanger and, at another end, a projecting lug onto which can be snapped a clip removably fixed on the secondary exchanger.

Thus, the assembly of exchangers is performed by simple nesting and snapping operations without it being necessary to call upon screws and particular tools. The mounting of the exchangers, as well as their possible dismantling, are therefore considerably assisted by this.

Other complementary or alternative characteristics of the invention are given below:
  one of the bases defines a housing having a shape paired with that of a pin, whereas the other base defines a housing offering a clearance for the mounting of the other pin.
  Each of the manifolds of the main exchanger is equipped with a base at a lower end and with a lug at an upper end.
  Each of the manifolds of the main exchanger, as well as its base and its lug, are made from a single piece by moulding, in particular from a plastic material.
  Each of the pins is formed at one end of a manifold of the secondary exchanger.
  Each of the pins is projectingly formed at a lower end of a manifold of the secondary exchanger.
  Each of the pins is formed directly by a lower end of a manifold of the secondary exchanger.
  Each of the clips comprises a first portion capable of being snapped into a lug of the main exchanger and a second portion equipped with a housing in which another pin of the secondary exchanger can be shrunk on.
  This other pin is attached to an upper end of a manifold of the secondary exchanger.
  This other pin is formed directly by an upper end of a manifold of the secondary exchanger.
  The secondary exchanger is itself equipped with two bases similar to those of the main exchanger and with two lugs similar to those of the main exchanger, which allows a first secondary exchanger to be fitted onto the main exchanger and, if necessary, a second secondary exchanger to be fitted onto the first secondary exchanger.
  The main exchanger is a cooling radiator of a motor vehicle engine, whereas the secondary exchanger is a supercharging air cooler of the engine or an air-conditioning condenser.
  The supercharging air cooler is equipped with two bases and two lugs, which allows it to be fitted directly onto the cooling radiator and a condenser to be fitted onto this supercharging air cooler.

BRIEF DESCRIPTION OF THE DRAWINGS

In the following description given only by way of example, reference is made to the attached drawings, on which.

DETAILED DESCRIPTION OF INVENTION

Figure 1:
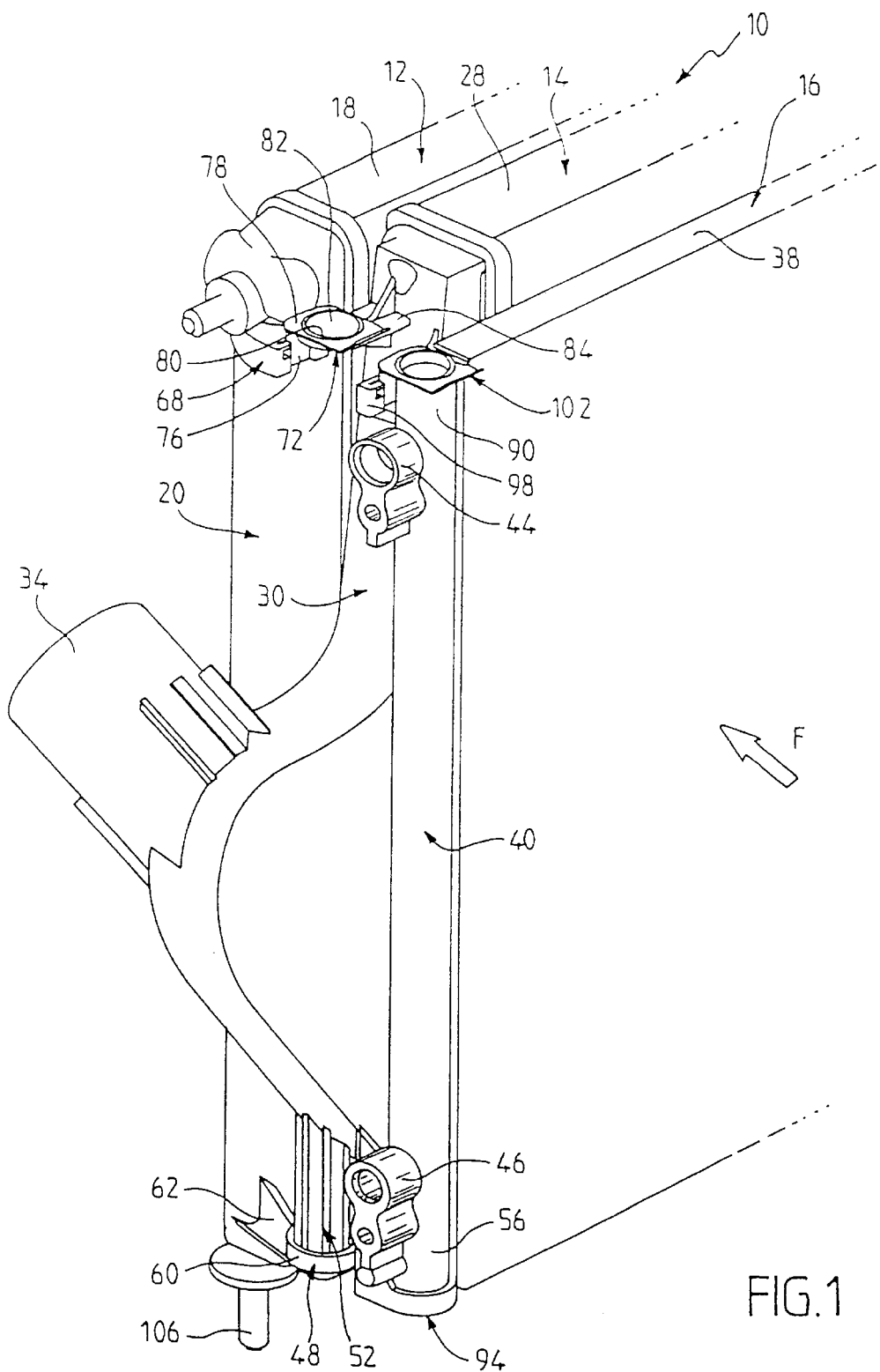
FIG. 1 is a partial perspective view of an assembly of heat exchangers according to the invention that comprises a main exchanger on which two secondary exchangers are fitted.
Figure 2:
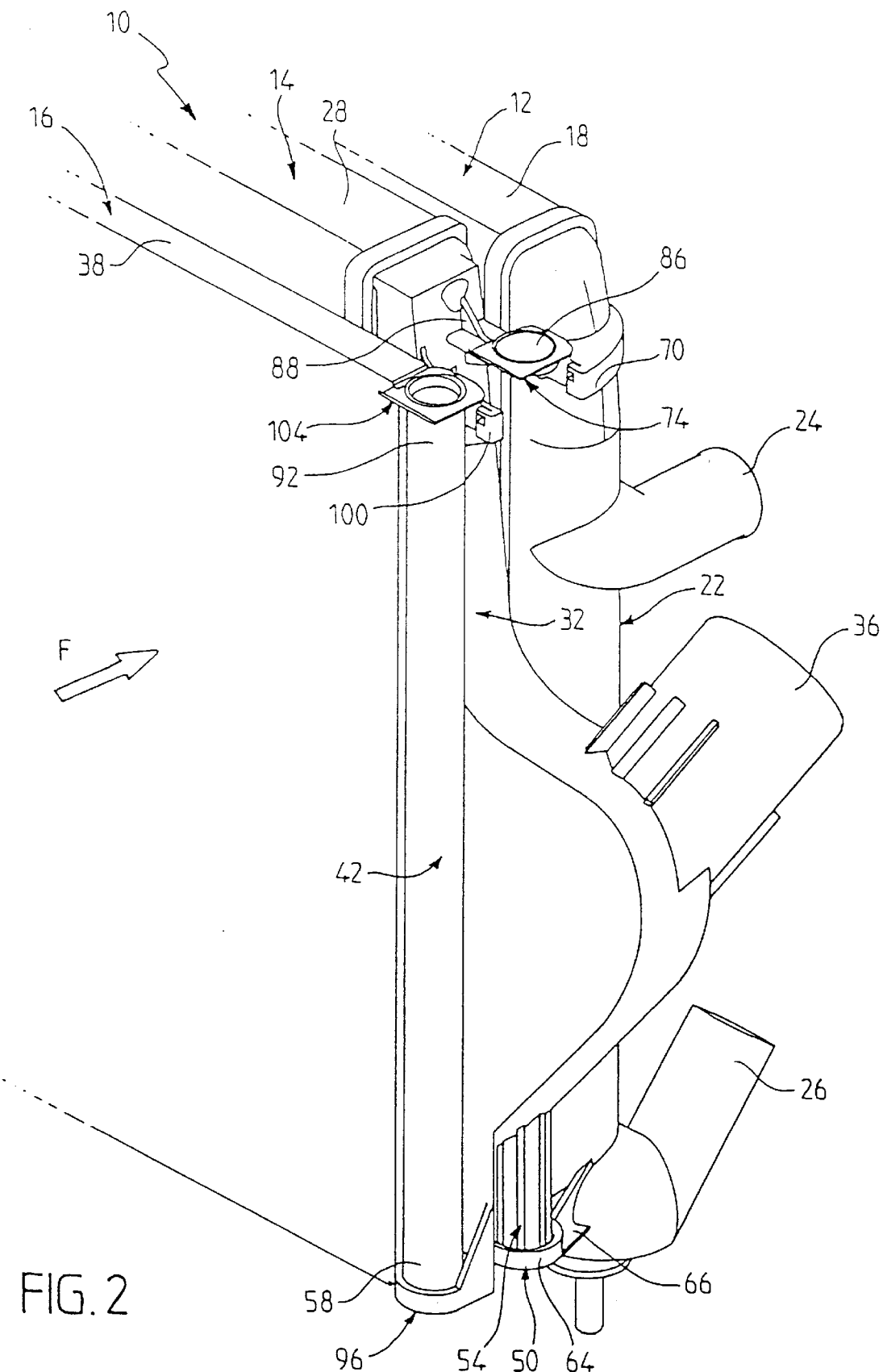
FIG. 2 is another partial perspective view of the assembly of FIG. 1.

Reference is firstly made to FIGS. 1 and 2 which show an assembly 10 composed of three heat exchangers: a main exchanger 12, a first secondary exchanger 14 fitted on the exchanger 12, a second secondary exchanger 16 fitted on the exchanger 14. In the example, the exchanger 12 is a cooling radiator of a motor vehicle engine, the exchanger 14 a supercharging air cooler of the engine and exchanger 16 an air-conditioning condenser.

The main exchanger 12 comprises a body or core 18 mounted between two manifolds 20 and 22, both produced by moulding a plastic material. The manifold 22 comprises two connection pieces 24 and 26 serving as the entrance and the exit of the cooling liquid of the engine.

The secondary exchanger 14 comprises a body or core 28 mounted between two manifolds 30 and 32 produced by moulding a plastic material. These two manifolds are equipped respectively with two connection pieces 34 and 36 serving as the entrance and the exit of a flow of compressed air intended for the supercharging of the engine.

The secondary exchanger 16 comprises a body or core 38 mounted between two manifolds 40 and 42 produced from metal and having a cylindrical configuration. The manifold 40 is equipped with two joining pieces 44 and 46 which form connection pieces for the entry and exit of a refrigerating medium circulating in an air-conditioning circuit.

The bodies or core 38, 28 and 18 are capable of being traversed by a flow of air F produced by the speed of the vehicle and/or by one or more appropriate electric fan units.

In accordance with the invention, means are provided to assemble the exchangers 12, 14 and 16 by the intermediary of their respective manifolds.

Respective bases 48 and 50 that protrude laterally are moulded in one piece with the manifolds 20 and 22 of the main exchanger 12. These bases delimit housings for respective pins 52, 54 projectingly formed respectively at the lower end of the manifold 30 and at that of the manifold 32 of the secondary exchanger 14. These pins have substantially the same general cylindrical shape and the same spacing as the lower ends 56 and 58 of the manifolds 40 and 42 of the secondary exchanger 16.

The base 48 (FIGS. 1 and 4) comprises a dish 60 attached to the manifold 20 by a lateral lug 62. This dish 60 is closely adapted to the cylindrical shape of the pin 52. Similarly, the base 50 (FIG. 2) comprises a dish 64 intended to receive the pin 54 and attached to the manifold 22 by a lateral lug 66. However, the dish 64 comprises a widened contour to enable the pin 54 to be received in spite of the dimensional variations of the exchangers.

Furthermore, with the manifolds 20 and 22 are integrally moulded, at the upper portion, respective lugs 68 and 70 that are projectingly formed. Onto each of these lugs can be snapped a clip 72 or respectively 74, which is able to be removably fixed onto the secondary exchanger 14. Each of these clips, for example the clip 72, comprises a first portion 76 capable of snapping into the lug 68 and a second portion 78 delimiting a circular housing 80 capable of receiving a cylindrical pin 82 attached to the manifold 30 of the exchanger 14 by a lateral lug 84 (FIG. 1).

In corresponding manner, the clip 74 defines a housing for a cylindrical pin 86 attached to the manifold 32 by a lug 88. The pins 82 and 86 are integrally moulded with the manifolds 30 and 32 on which they depend.

The pins 82 and 86 have substantially the same configuration as the respective upper ends 90 and 92 of the manifolds 40 and 42.

Thus, to fit the secondary exchanger 14 onto the main exchanger 12, it is sufficient to engage the pins 52 and 54 in the bases 48 and 50 whilst arranging the two exchangers in a parallel position. Then, it is sufficient to position the two clips 72 and 74 by simple nesting and snapping operations.

As can be seen on FIGS. 1 and 2, the secondary exchanger 14 is equipped in the lower portion with two bases 94 and 96 similar to the bases 48 and 50 of the exchanger 12 and having the same spacing. Moreover, this exchanger 14 comprises in the upper portion two lugs 98 and 100 having the same configurations as the lugs 68 and 70 of the exchanger 12. The base 94 and the lug 98 are integrally moulded with the manifold 30, whereas the base 96 and the lug 100 are integrally moulded with the manifold 32.

As a result, the exchanger 16 may be fitted onto the exchanger 14 in a similar manner by nesting the ends 56 and 58 of the manifolds 40 and 42 into the bases 94 and 96. Then it is sufficient to keep the exchanger 16 at the upper portion by clips 102 and 104 similar to the clips 72 and 74.

Figure 3:
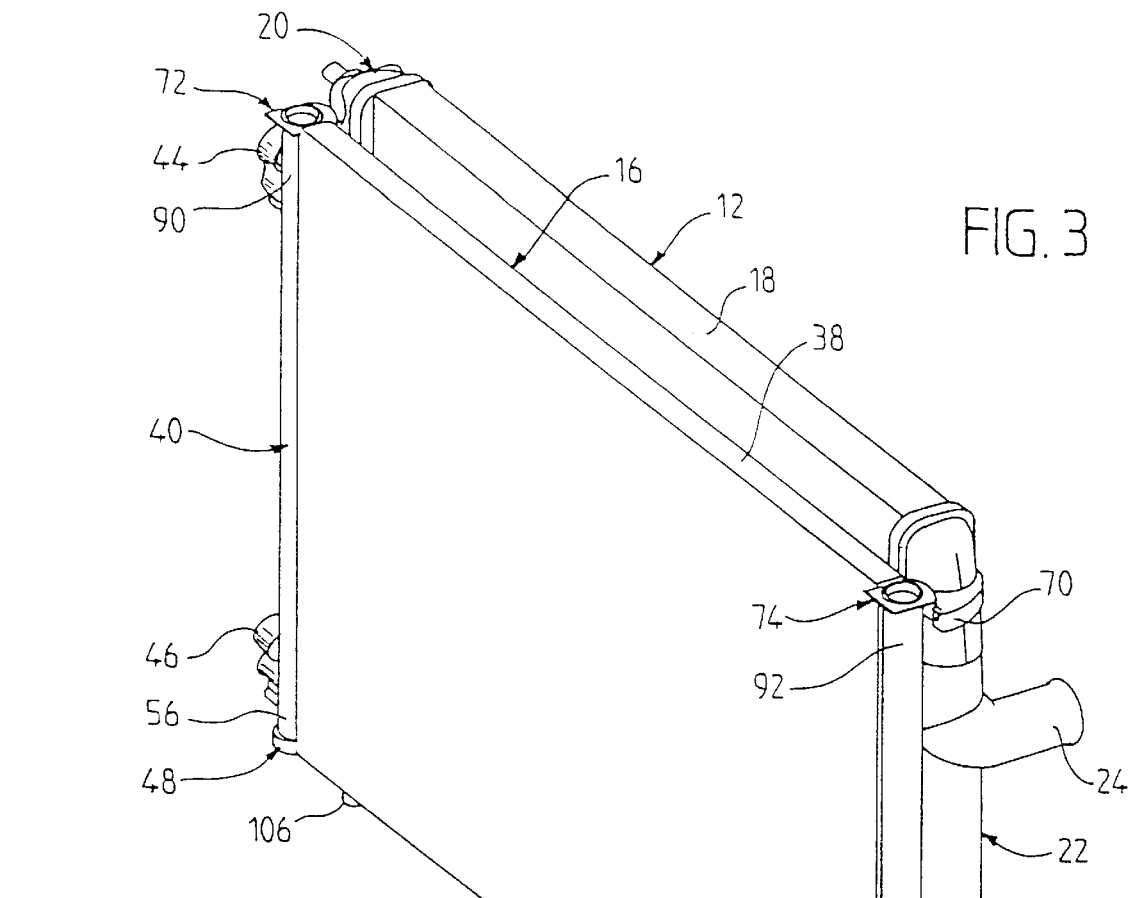
FIG. 3 is a perspective view of an assembly comprising a main exchanger and a secondary exchanger.

It will be understood that the exchangers 14 and 16 are thus interchangeable, which allows as a refinement, as shown in FIG. 3, the secondary exchanger 16 (condenser) to be fitted directly onto the main exchanger 12 (radiator) in the case in which the vehicle does not require a supercharging air cooler.

Figure 4:
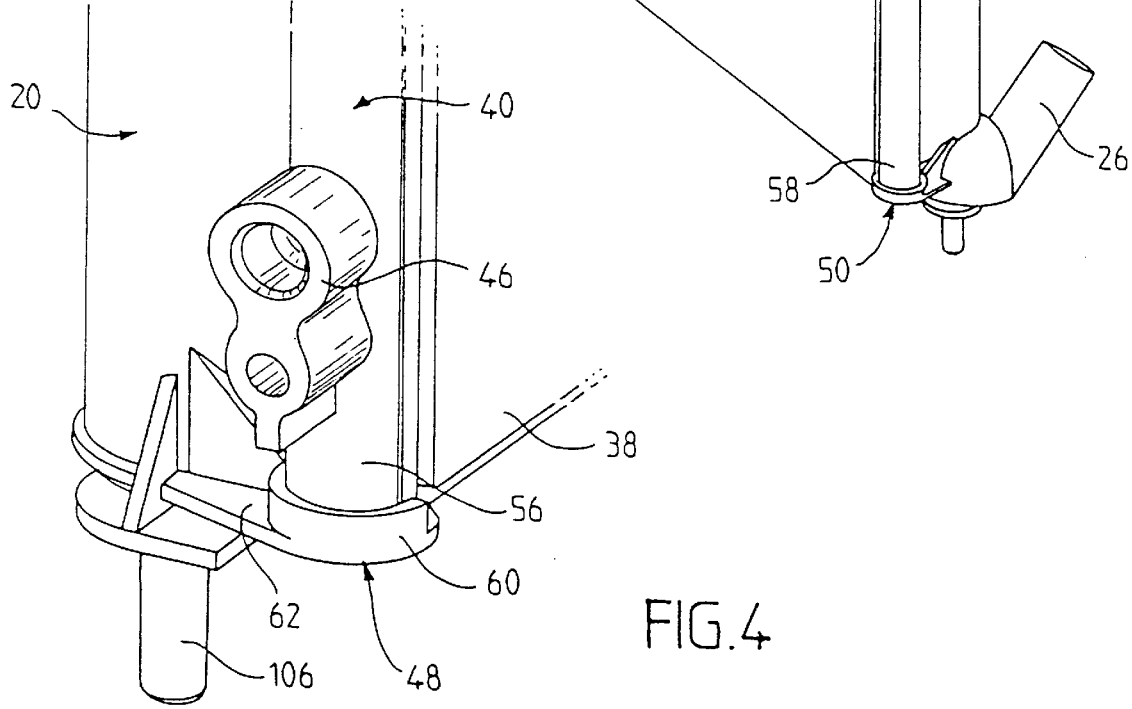
FIG. 4 is another partial perspective view on an enlarged scale of the assembly of FIG. 3.

FIG. 4 shows a detail of the mounting of the assembly of FIG. 3. It can be seen that the base 48 receives the lower end 56 of the exchanger 16. Furthermore, the manifold 20 of the exchanger 12 comprises in the lower portion a rod 106 allowing the mounting of the exchanger 12, and therefore of the assembly 10, on the structure (not represented) of the vehicle.

Figure 5:
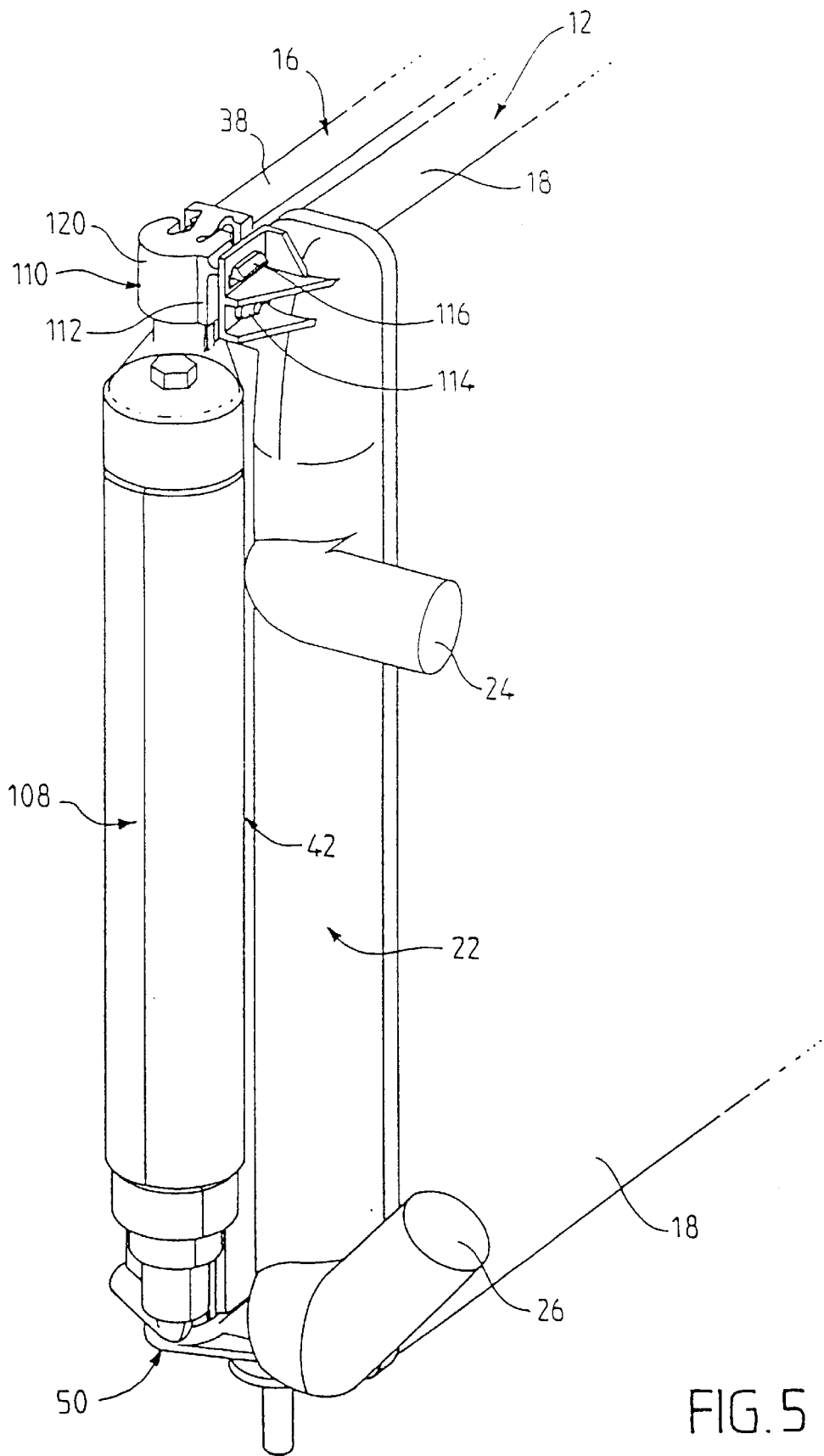
FIG. 5 is a partial perspective view of another assembly comprising a main exchanger and a secondary exchanger.

In the refinement of FIG. 5, to which reference is now made, the secondary exchanger 16 is also fitted directly onto the main exchanger 12. The manifold 42 of the exchanger 16 is attached to a tank 48 of general cylindrical shape which extends vertically. In this embodiment, the attachment is performed by a clip 110 which differs slightly from the clip 74 that was described above. This clip comprises a first portion 112 equipped with a pin 114 and an elastic lug 116 capable of cooperating with a lug 118 of the exchanger 12, and a second portion 120 capable of nesting directly onto the upper end of the manifold 42.

Thus, in accordance with the invention, it is possible to produce several different assemblies: exchanger 12 +exchanger 14; exchanger 12+exchanger 16; exchanger 12+exchanger 14+exchanger 16.

Of course, the invention is not limited to the embodiments given above and extends to other refinements.

It is possible, in particular, to specify that each of the manifolds comprises a longitudinal rib capable of coming to bear against a manifold of a secondary exchanger mounted on the main exchanger.

What is claimed is:

1. A heat exchanger assembly, comprising a main exchanger having a body mounted between two manifolds, on which is fitted at least one secondary exchanger having a body mounted between two manifolds so that a common air stream (F) can pass through the respective bodies of the exchanger, wherein each of the manifolds of the main exchanger is equipped, at one end, with a projecting base forming a housing for a pin of the secondary exchanger and, at another end, with a projecting lug onto which can be snapped a clip that is removably fixed on the secondary exchanger.

2. An assembly according to claim 1, wherein one of the bases defines a housing having a shape paired with that of a pin, whereas the other base defines a housing offering a clearance for the mounting of the other pin.

3. An assembly according to claim 1, wherein each of the manifolds of the main exchanger is equipped with a base at a lower end and with a lug at an upper end.

4. An assembly according to claim 1, wherein each of the manifolds of the main exchanger as well as its base and its lug are made of a single piece by moulding from a plastic material.

5. An assembly according to claim 1, wherein each of the pins is formed at one end of a manifold of the secondary exchanger.

6. An assembly according to claim 5, wherein each of the pins is projectingly formed at a lower end of one of the manifolds of the secondary exchanger.

7. An assembly according to claim 5, wherein each of the pins is formed directly by a lower end of one of the manifolds of the secondary exchanger.

8. An assembly according to claim 1, wherein each of the clips comprises a first portion capable of being snapped into a lug of the main exchanger and a second portion equipped with a housing in which another pin of the secondary exchanger can be shrunk on.

9. An assembly according to claim 8, wherein said other pin is attached to an upper end of a manifold of the secondary exchanger.

10. An assembly according to claim 8, wherein said other pin is formed directly by an upper end of a manifold of the secondary exchanger.

11. An assembly according to claim 1 wherein the second exchanger is itself equipped with two bases similar to those of the main exchanger and with two lugs similar to those of the main exchanger, which allows a first secondary exchanger to be fitted onto the main exchanger and, if necessary, a second secondary exchanger to be fitted onto the first secondary exchanger.

12. An assembly according to claim 1, wherein the main exchanger is a cooling radiator of a motor vehicle engine, whereas the secondary exchanger is a supercharging air cooler of the engine or an air-conditioning condenser.

13. An assembly according to claim 12, wherein the supercharging air cooler is equipped with two lugs, which enables it to be fitted directly onto the cooling radiator and an air-conditioning condenser to be fitted onto this supercharging air cooler.

* * * * *